US009611956B1

(12) United States Patent
Quinn et al.

(10) Patent No.: US 9,611,956 B1
(45) Date of Patent: Apr. 4, 2017

(54) APPARATUS AND METHOD FOR WELDING STEEL BOILER TUBES

(71) Applicants: Denny L. Quinn, Evansville, IN (US);
Alan W. Braun, Evansville, IN (US);
Brian S. Luigs, Evansville, IN (US);
Earl L. Young, Evansville, IN (US)

(72) Inventors: Denny L. Quinn, Evansville, IN (US);
Alan W. Braun, Evansville, IN (US);
Brian S. Luigs, Evansville, IN (US);
Earl L. Young, Evansville, IN (US)

(*) Notice: Subject to any disclaimer, the term of this patent is extended or adjusted under 35 U.S.C. 154(b) by 384 days.

(21) Appl. No.: 14/333,631

(22) Filed: Jul. 17, 2014

Related U.S. Application Data

(63) Continuation-in-part of application No. 12/657,010, filed on Jan. 12, 2010, now abandoned.

(51) Int. Cl.
| | |
|---|---|
| *B23K 9/12* | (2006.01) |
| *F16L 13/02* | (2006.01) |
| *B23K 9/028* | (2006.01) |
| *B23K 35/02* | (2006.01) |
| *B23K 37/02* | (2006.01) |
| *B23K 9/095* | (2006.01) |

(52) U.S. Cl.
CPC ........ *F16L 13/0236* (2013.01); *B23K 9/0286* (2013.01); *B23K 35/0294* (2013.01); *B23K 9/0282* (2013.01); *B23K 9/0956* (2013.01); *B23K 9/12* (2013.01); *B23K 9/122* (2013.01); *B23K 37/0211* (2013.01); *B23K 37/0217* (2013.01); *B23K 37/0229* (2013.01); *B23K 37/0276* (2013.01); *B23K 37/0282* (2013.01)

(58) Field of Classification Search
CPC ........ B23K 9/0956; B23K 9/12; B23K 9/122;
B23K 9/1286; B23K 9/1282; B23K 9/0052; B23K 9/0282; B23K 37/0211;
B23K 37/0217; B23K 37/0276; B23K 37/0282; B23K 37/0294; B23K 37/0229;
B23K 37/0533
USPC ............. 219/54, 61, 61.3; 285/288.1, 288.11
See application file for complete search history.

(56) References Cited

U.S. PATENT DOCUMENTS

| | | | | |
|---|---|---|---|---|
| 1,332,184 A | * | 2/1920 | Adams, Jr. ........... | B23K 9/0026 219/61 |
| 3,227,849 A | * | 1/1966 | Thielsch .............. | B23K 33/004 219/137 R |
| 3,238,347 A | * | 3/1966 | Rohrberg ............. | B23K 9/0286 219/60 A |
| 4,243,868 A | * | 1/1981 | Graham ............... | B23K 9/0286 219/125.11 |
| 4,611,830 A | * | 9/1986 | von Ahrens ........ | F16L 13/0227 219/60 R |
| 5,096,304 A | * | 3/1992 | Lai ........................ | G01K 3/04 374/176 |
| 5,538,177 A | * | 7/1996 | Takahashi ............. | B23K 1/012 228/196 |

(Continued)

*Primary Examiner* — Arthur O Hall
*Assistant Examiner* — Joseph A Greenlund
(74) *Attorney, Agent, or Firm* — Gary K. Price

(57) ABSTRACT

Apparatus and method for welding steel boiler tubes in a space restricted area using a pulsed-arc welding process. The process includes the use of a consumable insert ring having a T-shaped profile and flux material to provide deep weld penetration by a GTAW welding machine. Notches in the consumable weld ring allow for visual inspection of tube fit prior to weld.

15 Claims, 5 Drawing Sheets

(56) References Cited

U.S. PATENT DOCUMENTS

| | | | | |
|---|---|---|---|---|
| 5,726,417 | A * | 3/1998 | Claussen | B23K 37/027 219/125.11 |
| 6,325,277 | B1 * | 12/2001 | Collie | B23K 9/0286 228/212 |
| 6,884,963 | B1 * | 4/2005 | Ames | B23K 9/0026 219/136 |
| 7,285,747 | B2 * | 10/2007 | Payne | B23K 9/0203 219/145.31 |
| 2008/0247842 | A1 * | 10/2008 | Motsch | F16B 37/02 411/174 |
| 2010/0181759 | A1 * | 7/2010 | Quinn | B23K 9/0026 285/288.11 |

* cited by examiner

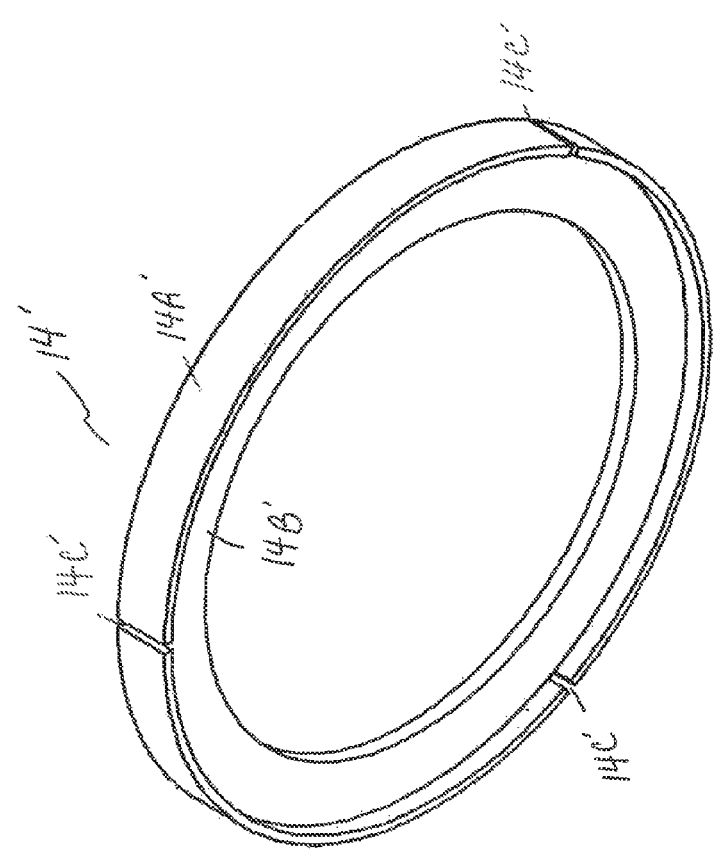

APPARATUS AND METHOD FOR WELDING STEEL BOILER TUBES

CROSS REFERENCES TO RELATED APPLICATIONS

This application claims the benefit of co-pending patent application Ser. No. 12/657,010 filed Jan. 12, 2010 which claims the benefit of U.S. Provisional Application No. 61/205,221 filed on Jan. 20, 2009 with the title "Apparatus and Method for Welding Steel Boiler Tubes."

STATEMENT AS TO RIGHTS TO INVENTIONS MADE UNDER FEDERALLY SPONSORED RESEARCH AND DEVELOPMENT

Not Applicable

BACKGROUND OF THE INVENTION

1. Field of the Invention

The present invention relates to a gas tungsten arc welding process for welding steel boiler tubes and more particularly, to a flux assisted insert welding that uses a consumable insert ring to substantially increase weld penetration.

2. Brief Description of Prior Art

Steel boiler tube replacement welds are currently done manually and generally characterized by tight tolerances on the radial clearance between the tubes which present special challenges. To allow the welder access to the joint and ensure complete penetration, the tube ends are prepped with a 37 degree bevel or other special end prep geometry. Due to the volume of material removed by the bevel process, multiple weld passes are required to complete the weld. As a result, the process requires a considerable amount of material preparation time and cost. Although manual welding can achieve acceptable weld quality, a highly skilled welder is required, which only exacerbates the complexity and expense of the welding process. Gas Tungsten Arc Welding (GTAW) using a flux for increasing weld penetration is known. U.S. Pat. No. 7,285,747 discloses an insert ring design used in the joining of steel tubes by a GTAW process. The '747 insert ring is used as a filler metal and includes a pair of grooves to retain a penetration enhancing flux while transporting and positioning the insert ring. However it was found that once the flux was applied to the '747 insert ring, the flux would dry before the ring was finally positioned. Once dried the flux had a brittle or "flaky" nature, and would fall off. As a result, the flux retention aspect disclosed in '747 adds more complexity to the process, results in severe welding defects, and causes quality control issues.

To the best knowledge of the applicants, a suitable, commercially practicable method has not been found for welding in a space restricted area, such as a boiler tube replacement application, using GTAW in combination with a consumable insert ring and where the use of a flux is desired in order to provide the penetration capabilities required by the design of the joint and the material properties.

As will be seen from the subsequent description, the preferred embodiments of the present invention overcome shortcomings of the prior art.

SUMMARY OF THE INVENTION

Briefly stated, the present invention is directed to an efficient method of welding thick section piping disposed in a tight space using a single pass. The process relates to a pulsed-arc welding process that includes the use of a consumable insert ring and flux to provide deep weld penetration by a GTAW welding machine.

BRIEF DESCRIPTION OF THE DRAWINGS

FIG. 5 is a perspective view of the consumable insert ring illustrating an alternate embodiment.

DESCRIPTION OF THE PREFERRED EMBODIMENT

Figure 1:
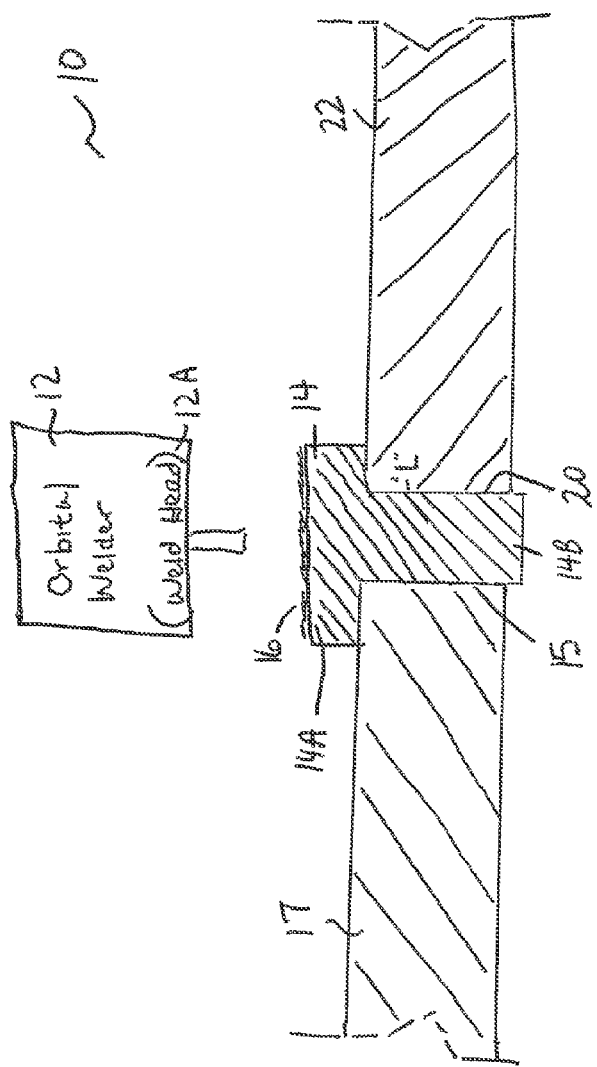
FIG. 1 is a side view of the consumable insert ring of the present invention used for welding steel boiler tubes.

In accordance with the present invention, a gas tungsten arc welding process for welding steel boiler tubes in a space restricted area is disclosed. More particularly, the described method relates to a pulsed-arc welding process for steel tubes that includes the use of a consumable insert ring and flux to provide deep weld penetration by a GTAW welding machine. Specifically, it will be noted in the following description that the present method discloses an efficient method of welding thick section piping disposed in a tight space using a single pass. In the broadest context, the process consists of components and steps configured with respect to each other so as to attain the desired objective.

The present invention is now exemplified by a particular embodiment which is illustrated in the accompanying drawings:

The method designated as numeral 10 for welding together steel boiler tube ends 15 and 20 of steel boiler tubes 17 and 22 includes in a preferred embodiment an orbital welder device 12, a weld ring 14 and a flux material 16. The orbital welder includes a weld head 12A similar to any commercially available low profile weld head on the market. Other welding techniques well known to those of ordinary skill in the art can be used in the art.

In the preferred embodiment, the weld ring 14 is supplied in the form of a weld ring T-shaped profile. The T-shape insert ring dictates that the tube ends have a flat face to ensure good contact with the ring. This allows for a simple tube preparation when compared to the prior art process of adding a 37 degree bevel or other special end prep geometry when manual tube welding. As such, preparing tubes, both new and old, is a simpler process, which results in cost savings.

Figure 2:
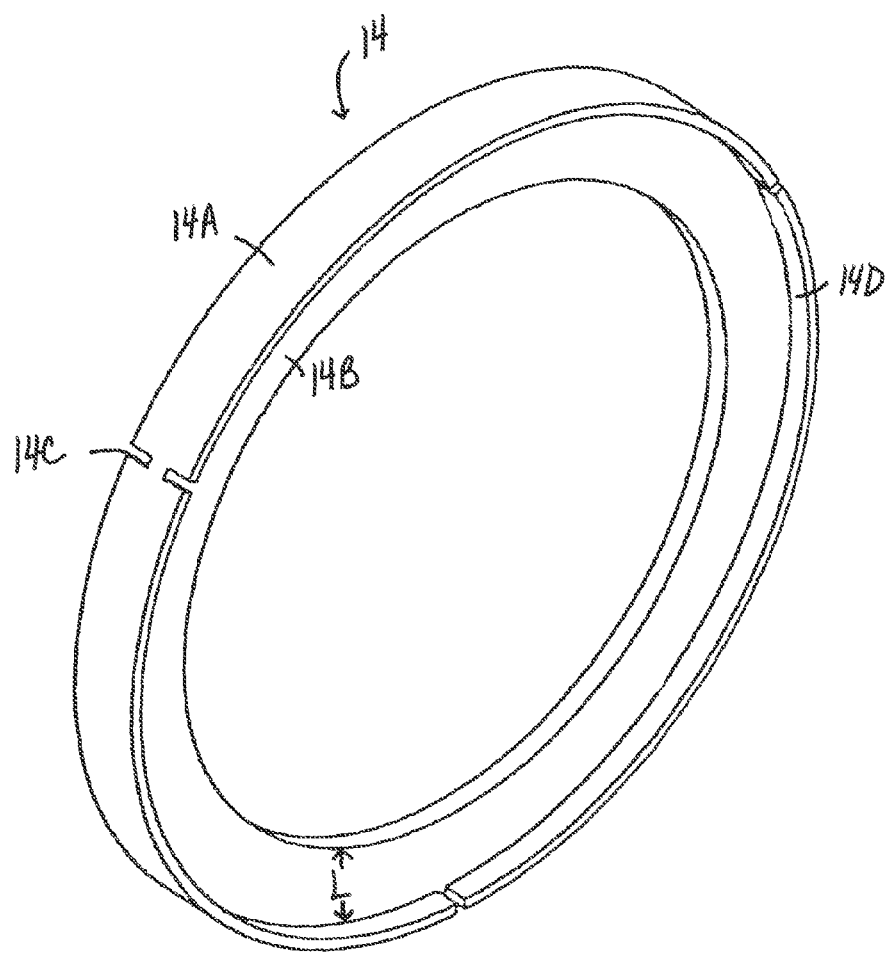
FIG. 2 is a perspective view of the consumable insert ring of the present invention.

As illustrated, the T-shaped structure 14 defines an outer band 14A in perpendicular relationship with an inner band 14B. More particularly, the inner band 14B extends from an interior surface 14D of the outer band 14A such that the outer band 14A is perpendicular to the inner band 14B. As best shown in FIG. 2 the outer band 14A includes at least one notch 14C. As will be further discussed, in application, the at least one notch 14C visually assures the tube ends 15 and 20 properly abut the inner band 14B prior to welding.

Filler metal can be formed into the weld ring using commercially available material conforming to the composition of the base tube such as, but not limited to, INMs2, IN515 and IN521 materials. The weld ring 14 is appropriately dimensioned to slip onto each end of the tube ends 15 and 20 being welded together. The weld rings 14 shape also aids in joint alignment. Weld ring 14 can be formed by any convenient process such as machining, sintering, stamping and so forth.

Flux material 16 improves heat penetration in the weld, thus reducing the weld width which reduces the potential for sagging and other weld profile problems that commonly occur during attempts to do a single pass welding operation on thick walled components. By more efficiently directing the heat inward to reduce the weld pool spread, the welding operation uses lower currents for full penetration compared to the currents which would be required without the use of flux. Reduced current allows for welding with relatively smaller lower power weld heads and power supplies and also further aides in maintaining the high strength and corrosion resistance characteristics in the weld.

Flux is typically available in powder form, but in this case is mixed with a liquid carrier to form a paste that is applied. More particularly, for best results when welding on steel, a mixture of penetration enhancing flux with methyl alcohol is preferred. Other flux materials and liquid carriers known in the art may be used. Preferably, flux 16 is applied to the outer band 14A of the weld ring 14 and on adjacent tube surfaces 15 and 20. The liquid carrier evaporates and the flux remains loosely adhered to the ring 14. Surface application as described facilitates the penetration enhancing characteristics of the flux.

Figure 3:
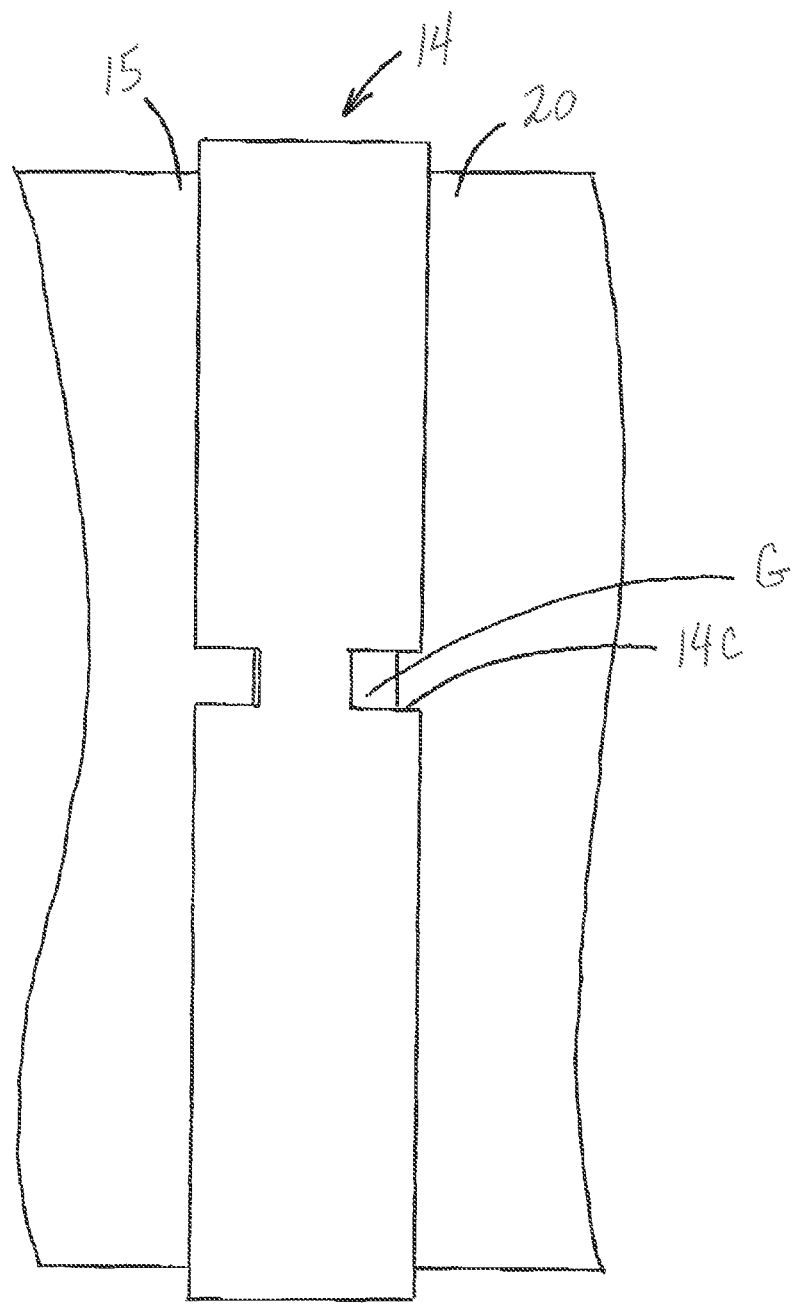
FIG. 3 is a side view of the insert ring in FIG. 2 with pipe ends inserted.

FIG. 3 shows the side view of the weld ring 14 with pipe end 15 inserted to a proper depth as seen in notch 14C and with pipe end 20 partially inserted into the ring 14. Visual inspection at the notches 14C will ensure proper tube alignment and fit. If pipe end 20 were welded as shown in FIG. 3, with the gap "G", it is likely to lead to an improper fit and weld. Preferably, and as shown in FIG. 2, the depth of the notch 14C is approximately one-half (½) of the width of the outer ring portion minus one-half (½) the thickness of the inner ring portion. This relationship allows the user to inspect and verify that the end of a tube is in close contact with the inner ring portion 14B of the weld ring 14. That is to say the notch is approximately the depth to reach the inner ring 14B portion. There can be any number of notches 14C and the material lost in the outer ring 14A will not adversely affect the resulting weld. The inventors have found that approximately three (3) notches 14C in the outer ring 14A will allow visual inspection and again, not adversely affect the resulting weld.

Alternatively, as shown in FIG. 5, notch 14C' of weld ring 14' extends the entire width of outer ring 14A'. This relationship further allows the user to inspect and verify that the end of a tube is in close contact with inner ring portion 14B' of the weld ring 14'. There can be any number of notches 14C' and the material lost in the outer ring 14A' will not adversely affect the resulting weld. The inventors have found that approximately three (3) notches 14C' in the outer ring 14A' will allow visual inspection and again, not adversely affect the resulting weld.

Further, as best shown in FIG. 1, the length "L" of the inner ring portion 14B is at least the thickness of the pipe end and preferably a bit wider. In the preferred embodiment, length L is calculated as follows:

$$L = \text{pipe end diameter on ring} - \text{a first value}*(\text{wall thickness} + \text{a second value})$$

where testing has determined the preferred value of the first value is approximately 2, and the preferred value of the second tolerance value is approximately 0.03.

For example, for a 2% tube: L=2.255−2*(0.180+0.03) =1.835.

Visual inspection at the notches 14C will ensure proper tube alignment and fit.

Once the weld ring 14 is properly fitted between the tubes 17 and 22 such that the tube ends 15 and 20 abut the inner band 14B of the ring 14, each of the at least one notches 14C is closed by tack welding. The tubes 17 and 22 are now welded together using GTAW welding from the outside of the tubes which uses any commercially available low profile weld head on the market. The welding is done in one pass due to the deep penetration provided by the consumable insert and the flux coated thereon. A second weld pass of lower temperature can be performed if required or desired.

Figure 4:
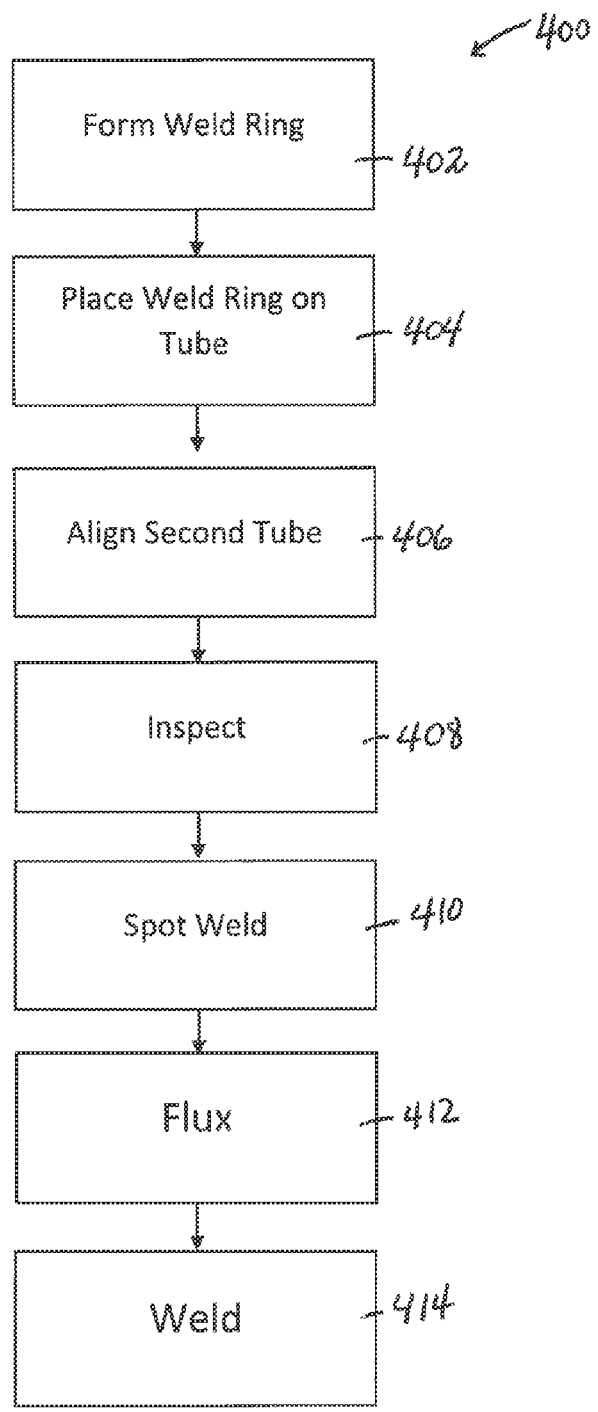
FIG. 4 is a flow sheet showing the process steps of the present invention.

Referring to FIG. 4, the method 400 of joining tube ends 15 and 20 is shown. Once a weld ring is formed 402 the ring 14 can be placed 404 on a first tube end 15 and then a second tube end 20 is aligned 406 and fitted into the ring 14. The tube ends 15 and 20 of tube section 17 and 22 are abutted together with weld ring 14 therebetween. The operator can inspect 408 using notches 14C that the ends 15, 20 are inserted entirely into the ring 14 so that the ends 15, 20 rest against the inner band 14B. There can be one set of notches 14C or several around the perimeter of the ring 14. Once the weld ring 14 is properly fitted between the tubes 17 and 22 as discussed, each of the at least one notches 14C is closed by tack welding 410.

Flux paste 16 can be applied 412 to the weld ring 14 an Orbital welder 12 is used to form a single pass welding 414 operation. The weld uses a continuous weld segment with pulsing of current and travel speed to achieve complete penetration. The advantages of pulsing are increased penetration on the high current and the avoidance of puddle sagging on the low current.

Although the description above contains many specificities, these should not be construed as limiting the scope of the invention but as merely providing illustrations of some of the presently preferred embodiments of this invention. Thus the scope of the invention should be determined by the appended claims in the formal application and their legal equivalents, rather than by the examples given.

We claim:

1. An orbital welding process for joining adjacent ends of two steel boiler tubes comprising the steps of:
    placing a weld ring on a first tube end,
    aligning a second tube end in said weld ring, such that said first and second ends are abutted together with an inner ring portion of said weld ring therebetween, wherein said weld ring having a T-shaped profile having said inner ring portion and an outer ring portion, and where said inner ring portion extends from an interior surface of said outer ring portion such that said inner ring portion is perpendicular to said outer ring portion, wherein said inner ring portion defines a length and each of said tube ends define a thickness, and wherein said length is greater than said thickness,
    ensuring the first and second tube ends are inserted entirely into the weld ring and the first and second tube ends rest against said inner ring portion of said weld ring by visually inspecting at least one notch in said outer ring portion of said weld ring, wherein said outer ring portion defines a width, and wherein said at least one notch extends said width of said outer ring portion,
    closing each of said at least one notches by tack welding,
    arc welding the adjacent tube ends together in a single orbital pass.

2. The process as recited in claim 1, including the step of applying a flux material to said outer ring portion of said weld ring and said first and second tube ends before the arc welding step.

3. The process as recited in claim 2, wherein said flux material includes a liquid carrier forming a paste.

4. The process as recited in claim 3, including the step of welding a second pass over the weld surface.

5. The process as recited in claim 4, wherein the second weld pass is at a lowered heat such that it does not affect the penetration of the weld.

6. A welding process for joining ends of two steel tubes comprising the steps of:
   abutting tube ends together with an inner ring portion of a weld ring therebetween, wherein said weld ring having a T-shaped profile having said inner ring portion and an outer ring portion overlapping each tube end,
   ensuring that the tube ends are properly positioned in said weld ring by inspecting at least one notch disposed in said outer ring portion, wherein said outer ring portion defines a width and wherein said at least one notch extends the width of said outer ring portion,
   closing said at least one notch by tack welding,
   welding the adjacent two tube ends together in a single pass.

7. The process as recited in claim 6, wherein the step of inspecting includes visually inspecting using said at least one notch to ensure that the tube ends rest against said inner ring portion of the weld ring.

8. The process as recited in claim 7, including the step of welding a second pass over the weld surface.

9. The process as recited in claim 8, wherein the second weld pass is at a lowered heat such that it does not affect the penetration of the weld.

10. The process as recited in claim 9, including the step of applying a flux material to said outer ring portion and said tube ends before the welding step.

11. A consumable weld rind for welding tube ends together comprising:
    a circular weld ring sized to fit on the ends of tubes and said weld ring having a T-shaped profile having an inner ring portion and an outer ring portion adapted to overlap each tube end, said inner ring portion extends from an interior surface of said outer ring portion and defines a length, wherein said length is greater than a thickness of each of said tube ends, and wherein said inner ring portion is perpendicular to said outer ring portion, said outer ring portion defines a width and said outer ring portion includes a plurality of notches having a length that extends said width for visually assuring proper seating of each of said tube ends against said inner ring portion, wherein said plurality of notches do not extend into said inner ring portion, and wherein said length of each of said plurality of notches is perpendicular to an outer perimeter of said weld ring, and wherein each of said plurality of notches further configured for receiving weld material by tack welding once the weld ring is aligned with each tube end.

12. The consumable weld ring as recited in claim 11, wherein each of said plurality of notches defining a depth that is approximately one-half the width of the outer ring portion minus one-half a thickness of said inner ring portion.

13. The consumable weld ring as recited in claim 11, wherein said length is the diameter of the tube end minus a first value times the tube end thickness plus a second value.

14. The consumable ring as recited in claim 13, wherein said first value is approximately 2.

15. The consumable ring as recited in claim 13, wherein said second value is approximately 0.03.

\* \* \* \* \*